(12) United States Patent
Fletcher et al.

(10) Patent No.: US 6,654,049 B2
(45) Date of Patent: Nov. 25, 2003

(54) METHOD, DEVICE AND COMPUTER PROGRAM PRODUCT FOR IMAGE STABILIZATION USING COLOR MATCHING

(75) Inventors: Susan Heath Calvin Fletcher, Huntsville, AL (US); Gene Arthur Grindstaff, Decatur, AL (US); Therman Ward McKay, III, Huntsville, AL (US)

(73) Assignee: Intergraph Hardware Technologies Company, Las Vegas, NV (US)

( * ) Notice: Subject to any disclaimer, the term of this patent is extended or adjusted under 35 U.S.C. 154(b) by 0 days.

(21) Appl. No.: 10/237,167

(22) Filed: Sep. 6, 2002

(65) Prior Publication Data

US 2003/0048359 A1 Mar. 13, 2003

Related U.S. Application Data

(60) Provisional application No. 60/318,164, filed on Sep. 7, 2001.

(51) Int. Cl.$^7$ .................... H04N 5/228; H04N 5/225; G06K 9/32
(52) U.S. Cl. .................. 348/208.6; 348/208.99; 348/169; 382/295
(58) Field of Search .................. 348/208.6, 208.99, 348/208.4, 208.12, 208.13, 169, 170, 172, 716; 382/294, 295, 165, 255, 275, 293

(56) References Cited

U.S. PATENT DOCUMENTS

| | | | | |
|---|---|---|---|---|
| 4,864,409 A | * | 9/1989 | Platte et al. | 348/208.6 |
| 5,099,323 A | * | 3/1992 | Morimura et al. | 348/207.99 |
| 5,253,052 A | * | 10/1993 | Hanashiro et al. | 375/240.12 |
| 5,629,988 A | * | 5/1997 | Burt et al. | 382/276 |
| 5,796,427 A | * | 8/1998 | Suzuki | 348/208.6 |
| 5,892,546 A | | 4/1999 | Hirabayashi et al. | 348/394 |
| 5,973,733 A | * | 10/1999 | Gove | 348/208.13 |
| 6,122,004 A | * | 9/2000 | Hwang | 348/208.13 |
| 6,144,405 A | * | 11/2000 | Toba | 348/208.4 |
| 6,211,913 B1 | * | 4/2001 | Hansen et al. | 348/239 |
| 6,493,041 B1 | * | 12/2002 | Hanko et al. | 348/699 |
| 2002/0168091 A1 | * | 11/2002 | Trajkovic | 382/107 |

FOREIGN PATENT DOCUMENTS

EP  0 613 020  8/1994

OTHER PUBLICATIONS

Guestrin, C., et al., "Fast Software Image Stabilization with Color Registration," Intelligent Robots and Systems, *IEEE/RSJ InternationalConference on Victoria, BC, Canada*, Oct. 13, 1998, 19–24.

International Search Report, dated Nov. 13, 2002; received Nov. 21, 2002.

* cited by examiner

*Primary Examiner*—Wendy R. Garber
*Assistant Examiner*—John M. Villecco
(74) *Attorney, Agent, or Firm*—Bromberg & Sunstein LLP

(57) ABSTRACT

A method for image stabilization of at least two digital images is disclosed. In such an embodiment, a first digital image having a plurality of pixels and at least a second image having a plurality of pixels are provided. Each pixel has an associated address for display and is representative of a color. Either a user of the system provides a color match range or the system provides a predetermined color matched range. A pixel is selected within the first digital image. Preferably the pixel is one that represents an item within the image that is either blurry due to movement of the item or appears jittery due to camera movement. Due to the vast number of available colors a pixel selected in a first image can be matched to a pixel in a second image within a range. The range allows for compensation due to lighting changes. Once the pixel in the first image is selected it can be compared to all pixels within the second image. Each pixel within the second image that is within the color match range is saved and the closest pixel color to the pixel from the first image is selected. The address of the pixels in the second image are then readdressed such that the address of the pixel located in the second image that has the closest color to the pixel in the first image now has the same display address as that of the pixel in the first image. The repositioned second digital image is then stored to memory.

42 Claims, 8 Drawing Sheets

METHOD, DEVICE AND COMPUTER PROGRAM PRODUCT FOR IMAGE STABILIZATION USING COLOR MATCHING

PRIORITY

This application claims priority from U.S. Provisional Application No. 60/318,164, filed Sep. 7, 2001 entitled "Method, Device and Computer Program Product for Analysis of Video Images", the full disclosure of which is hereby incorporated by reference herein.

TECHNICAL FIELD

The present invention relates to analysis of video images and more specifically to image stabilization of video images.

BACKGROUND

Video stabilization is known within the prior art to minimize image jitter due to camera movement through either mechanical feedback systems or through digital signal processing. The digital signal processing techniques of the prior art are complicated and often are based upon motion estimation and vector analysis. These techniques are designed so as to be minimally intrusive to movement within the image and assess movement of blocks of pixels in order to isolate camera movement jitter.

When objects move within captured video images as opposed to the camera moving details of the moving object being captured often are hard to discern. For example, a license plate of a moving car is often hard to read when the captured video images are displayed due to the great amount of motion from frame to frame of the car. In such a situation, an accounting for the motion of the car would enhance the ability to read the license plate.

The traditional image stabilization techniques as discussed above do not provide a way to account for motion such as the motion of a car in order to make a license plate more legible because the techniques are designed to allow such motion to be visible within the sequence of video images while only removing movement due to the movement of the camera.

SUMMARY OF THE INVENTION

In one embodiment of the invention, a method for image stabilization of at least two digital images is disclosed. In such an embodiment, a first digital image having a plurality of pixels and at least a second image having a plurality of pixels are provided. Each pixel has an associated address for display and is representative of a color. Either a user of the system provides a color match range or the system provides a predetermined color matched range. A pixel is selected within the first digital image. Preferably the pixel is one that represents an item within the image that is either blurry due to movement of the item or appears jittery due to camera movement. Due to the vast number of available colors a pixel selected in a first image can be matched to a pixel in a second image within a range. The range allows for compensation due to lighting changes. Once the pixel in the first image is selected it can be compared to all pixels within the second image. Each pixel within the second image that is within the color match range is saved and the closest pixel color to the pixel from the first image is selected. The address of the pixels in the second image are then readdressed such that the address of the pixel located in the second image that has the closest color to the pixel in the first image now has the same display address as that of the pixel in the first image. The repositioned second digital image is then stored to memory.

In other embodiments the image area that is to be searched within the second image may be selected by a user of the method. In another embodiment an alignment point can be selected for aligning the first digital image and the repositioned second digital image such that the pixel of the first frame is aligned with the alignment point and the pixel in the second digital image is aligned with the alignment point when displayed on a display device.

Once the second digital image is saved the first digital image and the repositioned second digital image may be displayed sequentially on a display device wherein the movement of the item will be minimized.

In a further embodiment, interpolation may be employed to determine color values for comparison in a sequence of video images. In the sequence, a beginning digital image and an ending digital image from the sequence creating a subset sequence are selected. A pixel is the selected in the beginning digital image and a pixel is selected in the ending digital image. Linear interpolation is performed between the color of the pixel in the beginning digital image and the color of the pixel in the ending digital image such that an interpolated color is determined for each image between the beginning digital image and the ending digital image. For each interpolated color associated with an image, a pixel is searched for within that image within a predetermined range of colors. Once a pixel is found, each image is repositioned so that the address of the pixel having the interpolated color is positioned to the address of the pixel selected in the beginning image.

In certain embodiments, the color match range may be equal to zero, such that an exact match needs to be found. The greater the number of representative colors, such as true color or 16.7 million colors, the greater the likelihood that a match of one pixel in a first frame represents the same physical location as that of a pixel in a second frame having the same or a very similar color. If a color is not found in an image that is within a color match range, the method can default to a standardized formula for repositioning the image based upon historic information.

The method may also be implemented in a computer system and embodied on a computer program product for use with the computer system in which the method is embodied in computer readable code. Further, the method may be embodied in a system which includes a user interface, a processor, and associated memory. The processor includes a user interface module for receiving signals from the user interface. In such a configuration, a user may send signals to the processor through the user interface indicating the video sequence to be processed, indicating a color match range, selecting pixel values, selecting alignment positions, for example. The processor also includes a location module for locating a pixel within a second frame having an associated color that is within a color range of a color associated with the pixel selection from the first video frame. The processor further includes a repositioning module for readdressing the second video frame so that the located pixel of the second frame has an address that is the same address as the pixel selection form the first video frame and also includes a storage module for storing the readdressed second video frame.

BRIEF DESCRIPTION OF THE DRAWINGS

The features of the invention will be more readily understood by reference to the following detailed description, taken with reference to the accompanying drawings, in which:

FIG. 3A shows a first frame with a selected pixel;

FIG. 3B shows a second frame with a pixel marked having a color within a color tolerance of the pixel selected in FIG. 3A;

FIG. 3C shows the second frame of FIG. 3B superimposed and realigned on the first frame of FIG. 3A;

DETAILED DESCRIPTION OF SPECIFIC EMBODIMENTS

Figure 1:
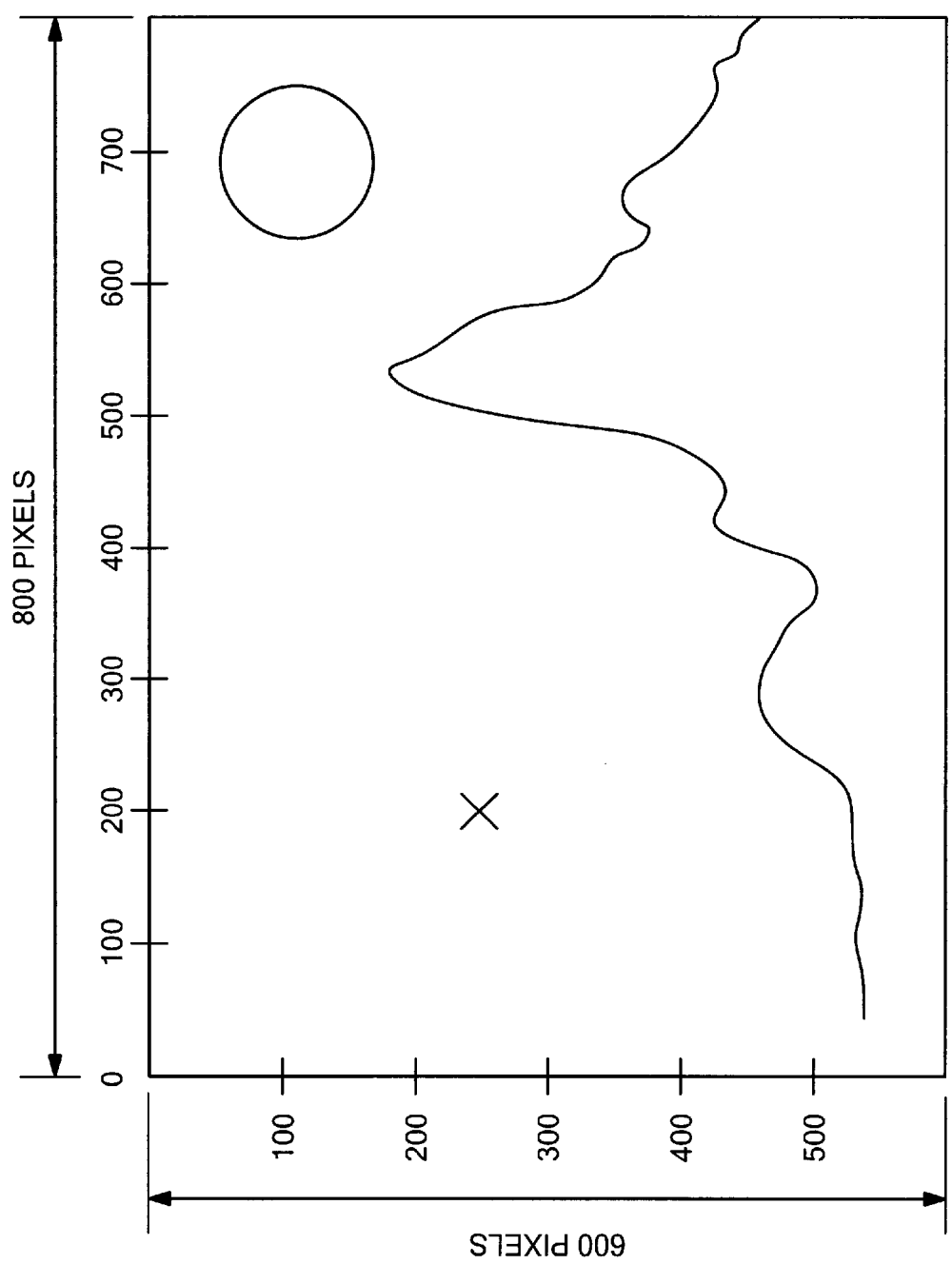
FIG. 1 is an image having a resolution of 800×600 pixels.

As used in the following text, the term "video sequence" implies a digital representation of a sequence of images which may be temporally displayed on a display device. Typically, a video sequence contains a plurality of frames wherein each frame represents a separate image. The frames may be further subdivided such that the frames are made up of a series of pixels. As used in the following description the term "pixel" shall mean a single point of an image. The greater the number of pixels that are contained in an image, the greater the resolution of the video. Resolution of an image/frame is conventionally referenced by length and width measurements of the number of pixels, for example, in a resolution of 800×600, there are 800 pixels along the length of an image by 600 pixels along the width of the image. Associated with each pixel is an address. For example as shown in FIG. 1, an image having a resolution of 800×600 is presented and pixel at address (200,300) is marked with an X wherein the origin is located at the upper left hand corner of the screen. As used herein a frame may be either a complete image or a portion of an image, such as a field which includes only one half of a complete image.

In an embodiment of the invention, a method is presented for stabilizing video images of a digital video sequence wherein the digital video sequence includes a plurality of digital images/frames. Stabilization is performed through color matching of a selected pixel color in a first frame by searching for a pixel in a second frame that has a color which falls within a color tolerance. The second frame is then aligned with the first frame such that the pixel in the second frame with the matching color has the same pixel address as that of the selected pixel from the first frame. The second frame is then stored to memory. This methodology is especially useful as the resolution and number of possible colors which can be represented increases. As video moves to HDTV formats which have 16.7 million and greater possible colors for a pixel color value, pixel color values become more unique and thus color tracking is more effective means for matching images and providing stabilization of images and accounting for motion within images.

Figure 2:
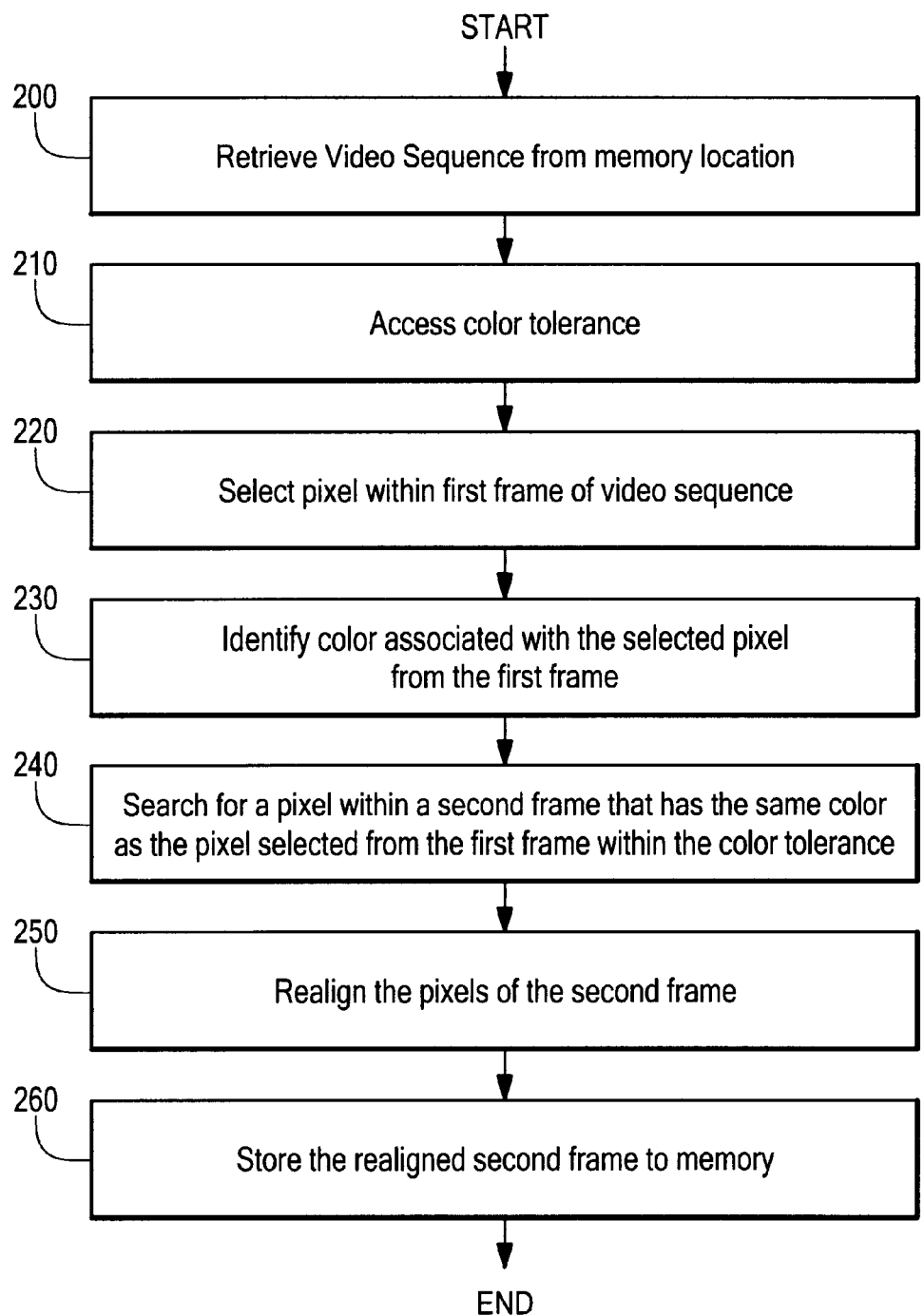
FIG. 2 is a flow chart showing one method for image stabilization through color matching performed in conjunction with a computer system.
Figure 3A:
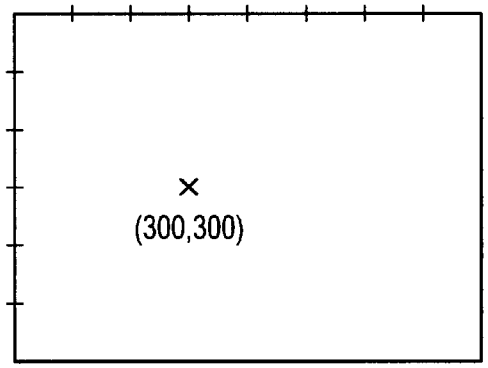
FIGS. 3A–C show pixels being repositioned on a screen.
Figure 3B:
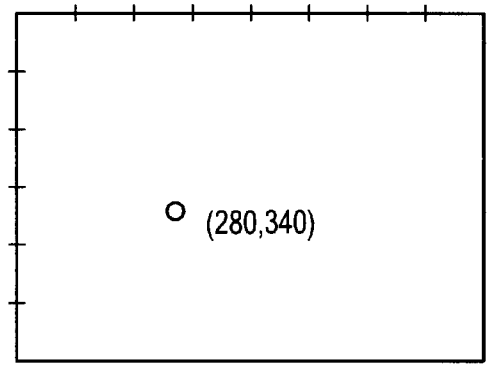
Figure 3C:
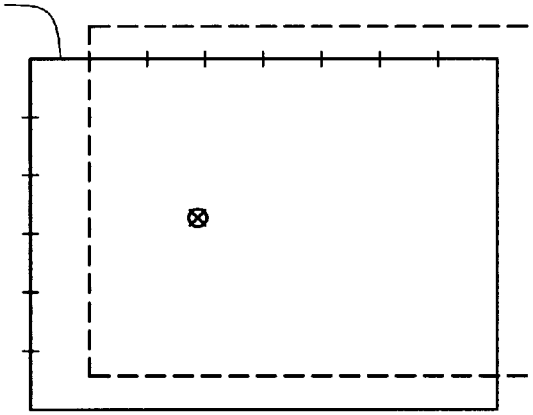

The method for image stabilization through color matching is performed in conjunction with a computer system wherein the computer system includes at least a display, an input device, associated memory and a processor. The method is explained in more formal detail with reference to FIG. 2. First a digital sequence is retrieved by the processor of the computer system from a memory location 200. A color tolerance is either predetermined and accessed by the processor or the user is queried for entry of a color tolerance 210. The color tolerance is the range within which a color match will be deemed to occur. A first frame of the video sequence is then displayed to a user. The user then selects a pixel within the first frame 220. Preferably the pixel is of a distinct color or the pixel is part of an object which moves within the video sequence and appears jittery when the video sequence is displayed. After the pixel is selected, the processor identifies the color associated with the pixel 230. The processor then retrieves the second frame and performs a search of the second frame to identify a pixel that has the same color as that of the selected pixel from the first frame within the color tolerance 240. Color matching may be performed by taking the overall color for a pixel including all color components or weighting the individual color components. For example, if the video sequence is represented in an R,G,B, color space, an identical color match (i.e one having a color tolerance of 0%) might require that each of the R,G, and B values are identical. The color tolerance may be the overall difference in color as a percentage. For example, a color tolerance may be 0.005% wherein the color space includes 16.7 million colors or a color tolerance may require that each color component must be within a certain tolerance of say 10% of each R,G, and B value of the selected pixel. Once a pixel within the second frame is identified, the pixel address from the second frame is then aligned with the pixel address of the selected pixel of the first frame 250. FIGS. 3A, B and C show the pixels being repositioned. FIG. 3A shows a first frame with a selected pixel marked with an X as would be displayed in the display device. FIG. 3B is a second frame wherein a pixel that matches the selected pixel from the first frame is identified with an O. FIG. 3C shows that the displayed pixels of the second frame is repositioned, and thus readdressed. After the second frame is repositioned and thus the addresses of all of the pixels of the frame are changed, the realigned second frame is stored to memory by the processor 260. This process can be continued for each frame of a video sequence. In such an embodiment, the color of the selected pixel from the first frame would be searched for in each subsequent frame. It should be noted that some pixel values of the realigned second frame will not be shown on the display device because the new addresses of these pixels falls outside of the display addresses. Further, some display addresses for the second realigned frame will not have color values for the pixels. In one embodiment, these pixel addresses are made black. In other embodiments, default color values can be assigned such as the color values from adjacent pixel addresses.

Figure 4:
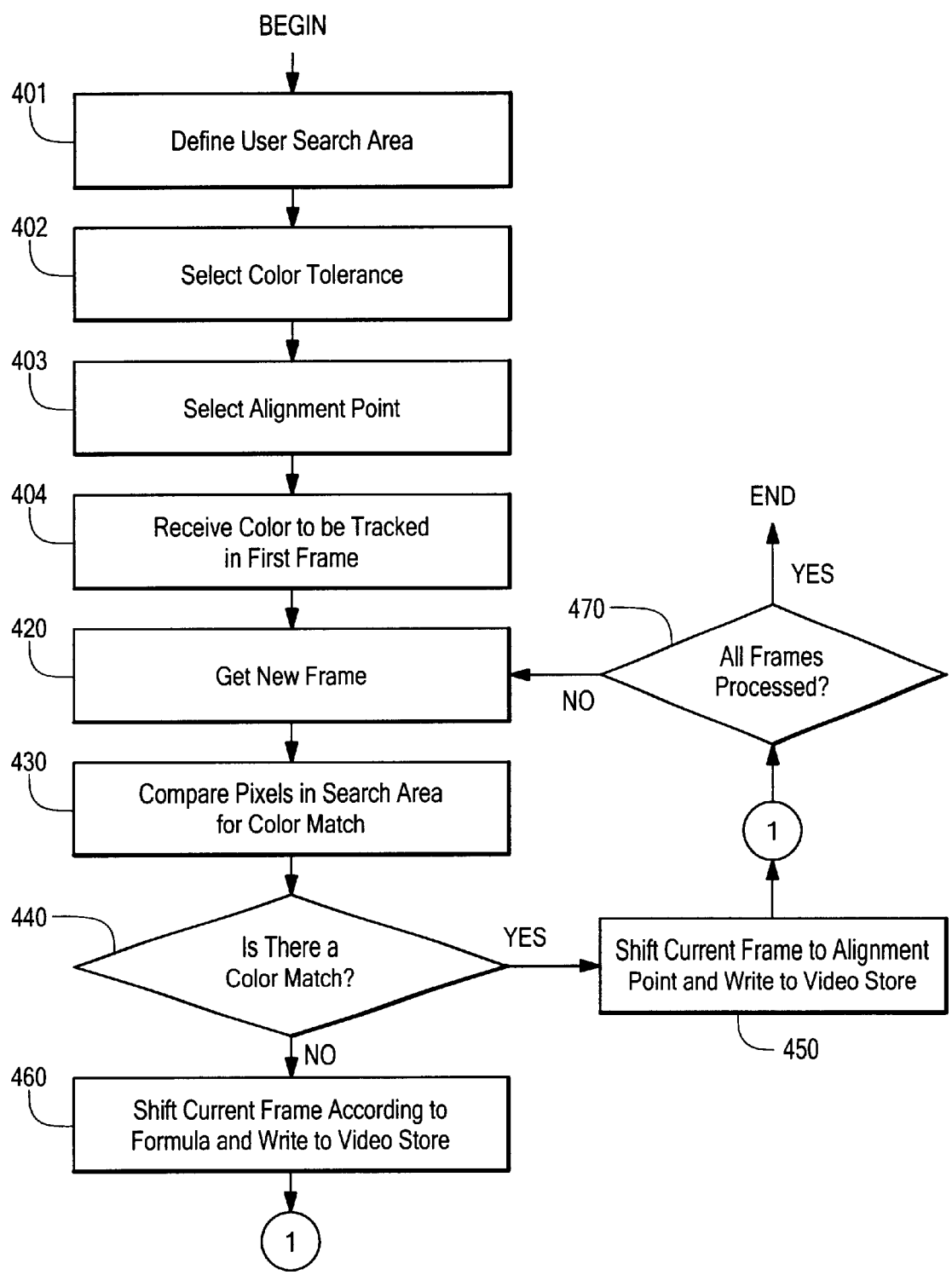
FIG. 4 is a flow chart showing another embodiment for image stabilization.

The methodology may be further defined as shown in FIG. 4. As expressed above, a video sequence is received by a processor from a memory location. A first frame is presented to a user. The user defines a search area within a video frame step 401. For example, the user may use an input device such as a mouse or a light pen to graphically indicate the search area. In one embodiment, the entire video frame is the default search area. Defining a search area that is less than the entire image may be beneficial in images in which a user is interested in a particular element of an image.

For example, if the video sequence is of a car that is driving away and the user is interested in the license plate of the car, the user may select a sub-section of the video frame. In the example, the user would indicate that the license plate or a portion of the car was the selected sub-set of the image. The image displayed after re-alignment of the frames could be the entire video frame or just the selected sub-set of the frame.

In a video sequence in which the moving object that is desired to be made still moves across the entire frame, selection of a sub-section of the image, such as that of a license plate, should be done over a short sequence of frames. For example, if the entire sequence is of 120 fields of video (approx. 2 sec.), the sequence may be subdivided such that only a few frames (for example 10 fields) are used. The car and the license plate can then be designated as the sub-section of the image for comparison purposes since the license plate of the car will not move many pixel locations over 10 fields. By selecting a sub-section, this improves the odds that the color matched pixels actually represent the same physical point.

The user is also prompted by the computer system for a color tolerance which as explained above is the acceptable margin of error for matching a color 402. The user can also indicate an alignment point which is the point on the output screen of the display device at which to align the pixel whose color best matches the tracking color 403. In one embodiment, the default is the center of the screen of the display device although other positions on the display may also be selected. The user also provides the color to be tracked 404. This is done by observing the first video frame and selecting a pixel using the user input device.

For each video frame 420, the color values for each pixel of the search area are compared 430 with the color values of the selected tracking color from the first video frame. If the color values for the color space (e.g. R,G,B) of a pixel are within the entered tolerance 440, the pixel will be considered a match. The pixel in which the sum of the absolute values of the differences between the red, green and blue color values to those of the tracking color is smallest is identified as the color match point. If the color match point is within the entered tolerance for each of the color space values associated with the selected pixel, the frame is shifted 450 so that the pixel identified as the best color match is placed at the alignment point on the screen and the shifted frame is then written out to memory. If no color match is found, the image is shifted 460 according to a predetermined formula. For instance, the shifts may be determined by analyzing past shifts and averaging the shifts to determine how to align the frame of video data. For example, the image may be shifted in the x direction by a weighted average of previously shifted distances in the x-direction. Similarly, the shift in the y direction may be a weighted average of previously shifted distances in the y-direction.

In other embodiments, the image may be shifted according to the following formulae:

$$xdiff=((sx1-sx2)+(sx2-sx3)+(sx3-sx4))/3*(sd); \text{ and}$$

$$ydiff=((sy1-sy2)+(sy2-sy3)+(sy3-sy4))/3*(sd); \text{ where}$$

sx1 = previous horizontal shift;  sy1 = previous vertical shift;
sx2 = horizontal shift before sx1;  sy2 = vertical shift before sy1;
sx3 = horizontal shift before sx2;  sy3 = vertical shift before sy2;

-continued sx4 = horizontal shift before sx3;  sy4 = vertical shift before sy3; and
where sd is a slowdown factor.

The frame is then shifted 460 by an amount given by the following equations: horizontal shift=sx1+xdiff; and vertical shift=sy1+ydiff.

The shifted frame is then written out 465 to the video image store.

If the input stream contains 470 more video frames, the next frame is processed 420. Once all of the frames in the input stream are processed, the color tracking operation is complete.

Once all of the frames of video are repositioned using the color tracking, the sequence of frames may be temporally displayed on a display device and thus movement of the camera or object will be reduced. Other than display of the video frames in a temporal fashion, the video frames may be linearly averaged in order to provide a higher definition image or portion of an image For example, a license plate on a vehicle that is moving and which is unreadable due to jitter may be readable once the image is stabilized. Even if it is not, all of the frames may be linearly averaged together to produce a higher resolution image that may provide an enhanced image wherein the license plate is legible. By precisely aligning the images to a sub-pixel resolution, and averaging the images together, a higher resolution image can be generated. This is due to the fact that as several images of an object are captured, each image presents a slightly different part of the object in each frame. In general a minimum of three to five frames are needed to improve the image.

Figure 5:
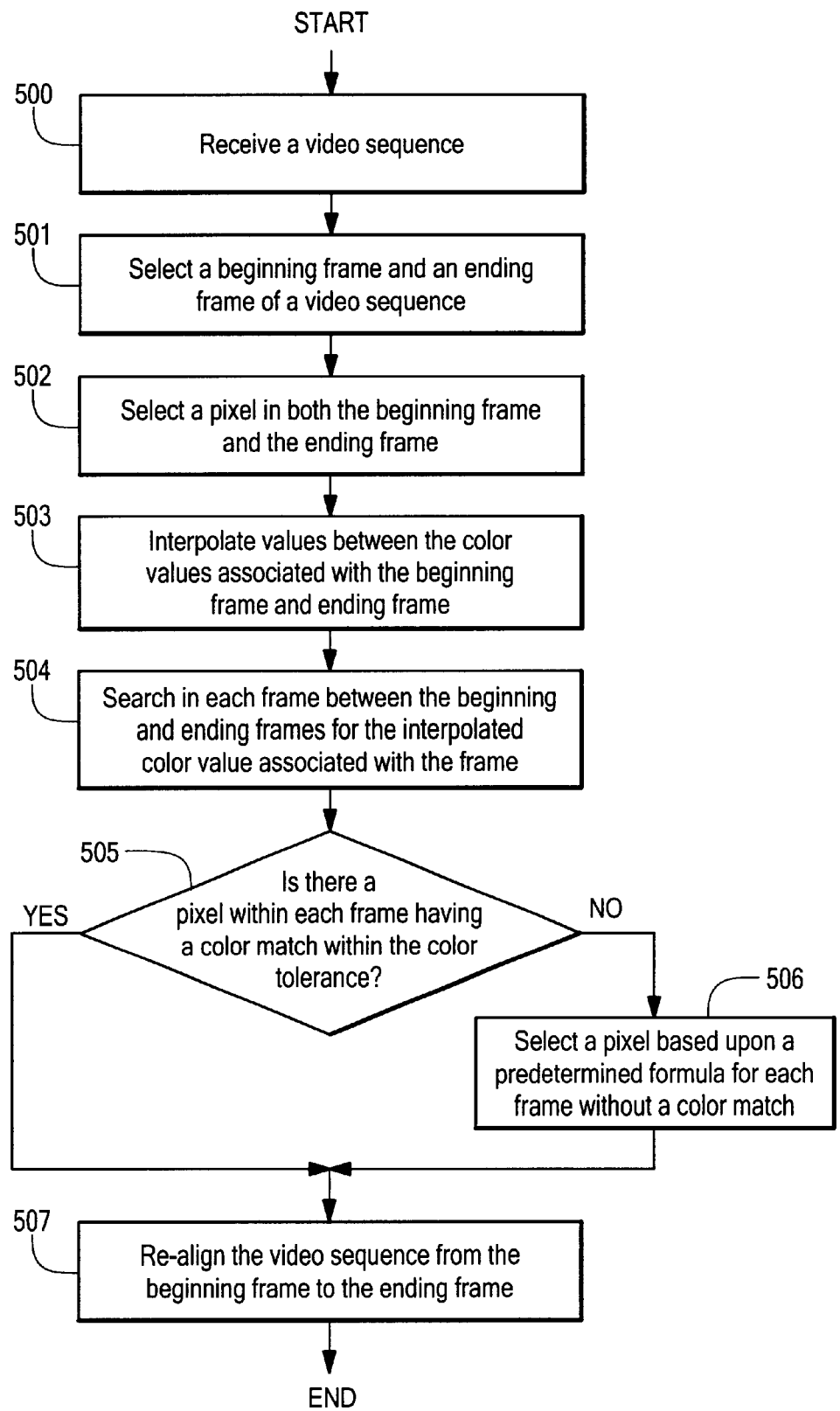
FIG. 5 is a flow chart showing another embodiment of image stabilization using color matching and interpolation.
Figure 6:
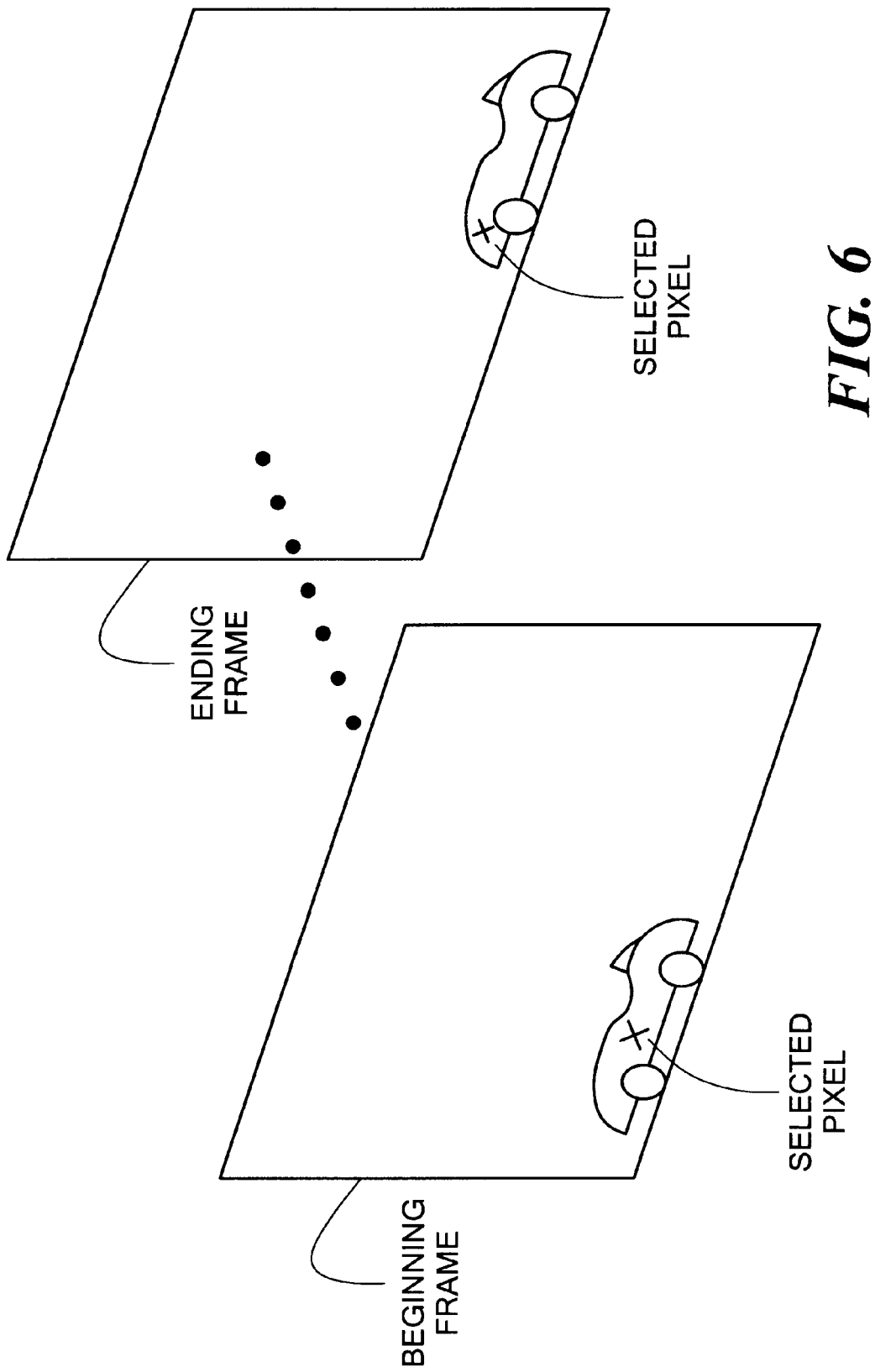
FIG. 6 shows pixel selection in a beginning and ending frame of a video sequence.
Figure 7A:
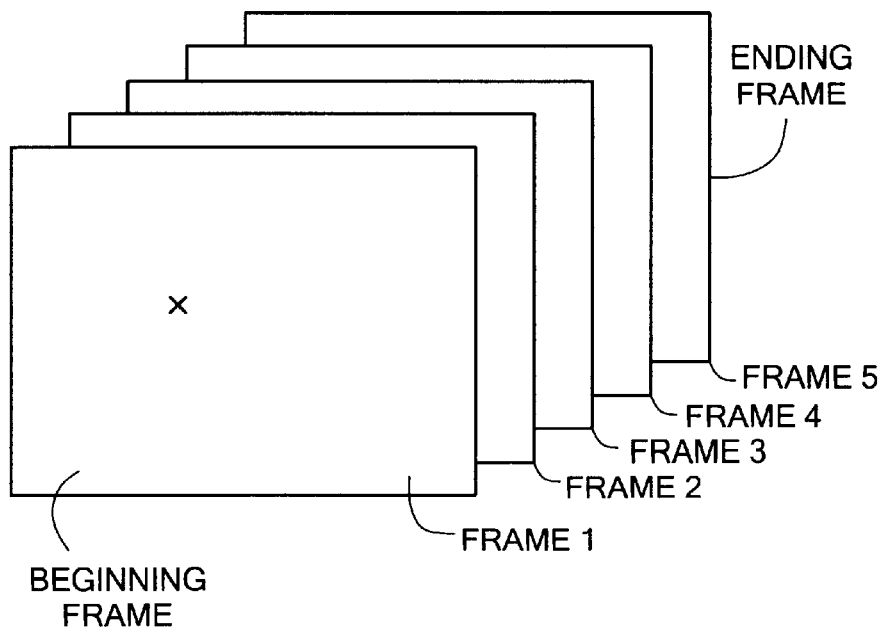
FIG. 7A shows a video sequence prior to image stabilization in which all of the images are aligned.
Figure 7B:
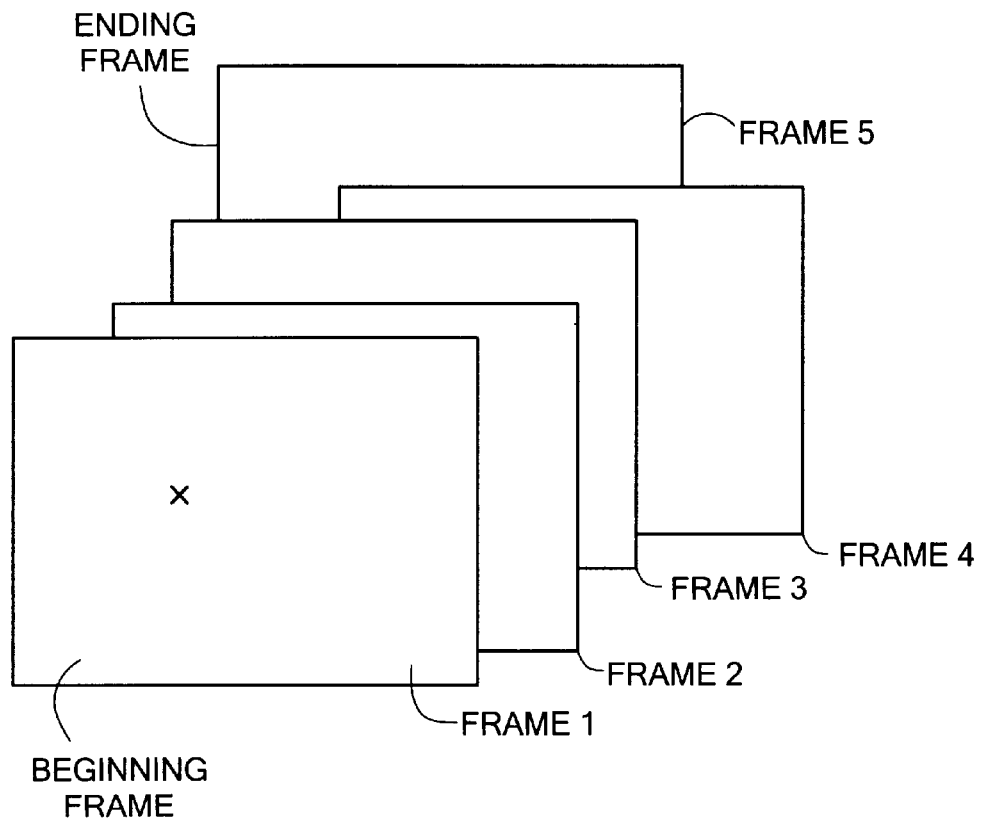
FIG. 7B shows the video sequence of FIG. 7A after realignment.

In another embodiment of the invention, interpolation is employed in conjunction with color matching as is explained in FIG. 5. In such an embodiment, a video sequence is provided into a computer system 500. A user of the system is allowed to view the video sequence on a display device and select a beginning frame and an ending frame 501. A pixel is selected in both the beginning frame and the ending frame 502. Preferably the pixel in the beginning frame and the ending frame is a pixel is part of an object for which motion stabilization is desired. For instance, a pixel may be selected from a video image of a car that is moving. A pixel in the ending frame should be selected that is part of the car as shown in FIG. 6. The system then interpolates between the color value for the selected pixel in the beginning frame and the color value of the pixel in the ending frame 503. The interpolation method may be any interpolation method known by one of ordinary skill in the art, such as linear, bi-linear, and bi-cubic interpolation. The interpolation method provides interpolation values for each frame between the beginning frame and the ending frame. For example, if there are four frames, an interpolated color value would be determined for the second and third frames. Once a color value is determined for each frame between the beginning and ending frames, the processor begins to search for that color value in each respective frame 504. The processor may use a color match range/color tolerance to locate a pixel that matches the color. In one embodiment the processor searches for the first pixel that has the exact color and does not use a color tolerance. In another embodiment, each pixel that is within the color tolerance is saved to memory and a difference measurement as described above is determined until the pixel with the closest color match is determined 505. If no pixels match, the processor employs a formula such as that provided above, or another formula that is based upon trend analysis or another property of the video sequence 506. When a pixel has been selected for each frame, the frames after the beginning frame including the ending frame are re-aligned 507. Realignment requires that the associated addresses of each pixel are re-determined, such that when the video sequence is displayed on a display device the pixel location of the pixel selected in the first frame corresponds with the pixels in the subsequent frames that match the color value. For example, as shown in FIG. 7A a pixel is selected in the beginning frame wherein the remaining frames are aligned as they would normally be displayed. FIG. 7B shows the video frames realigned such that the color matched pixels from all frames subsequent to the beginning frame are positioned at the same point on a display screen as the selected pixel from the beginning frame. This process can be repeated if less than the entire video sequence is included between the beginning frame and the ending frame.

Figure 8:
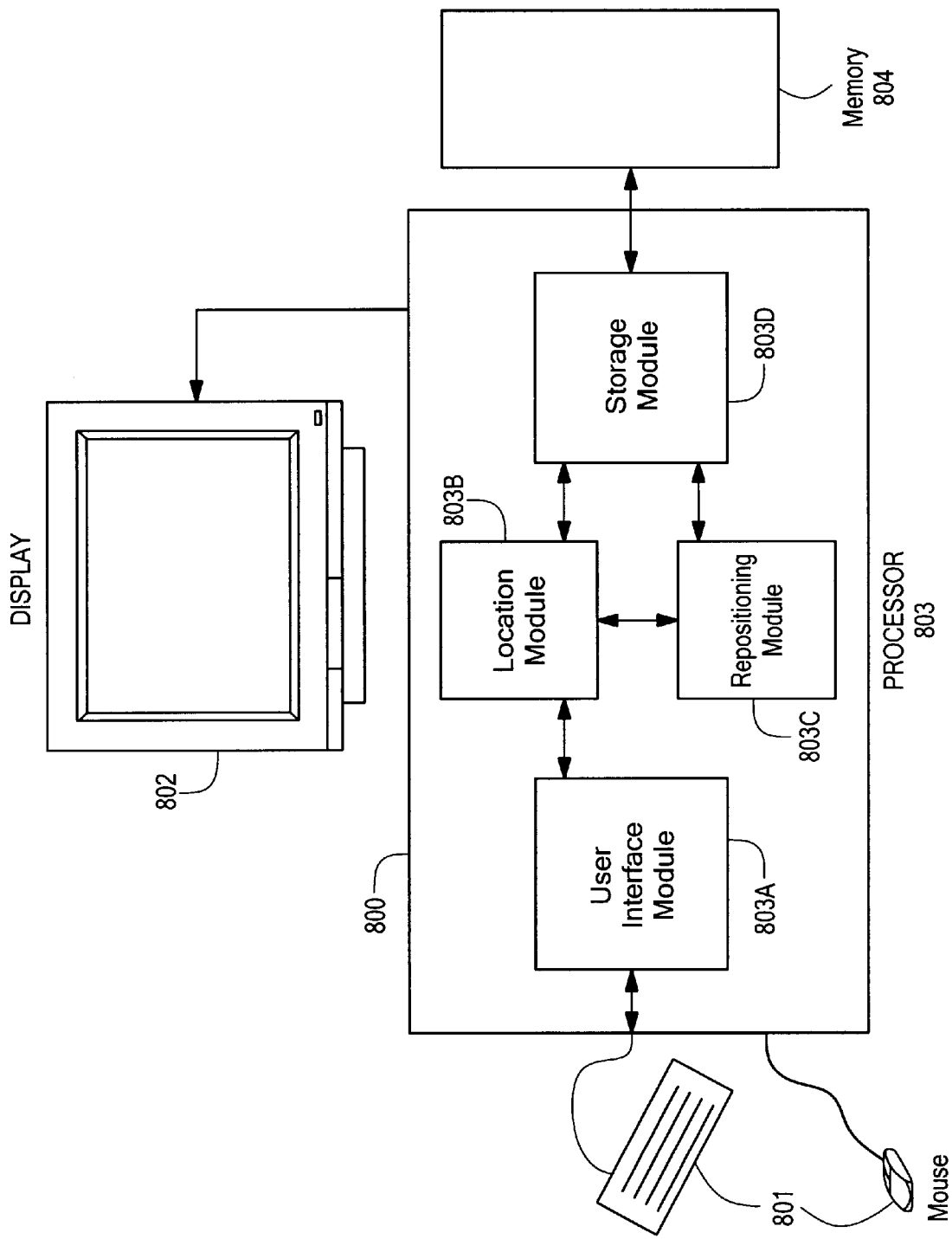
FIG. 8 shows one embodiment of the invention as a system.

The method for image stabilization may be embodied as a system as shown in FIG. 8. The system 800 includes an input device 801 such as a mouse, trackball, keyboard, etc. and video display 802 and a processor 803 having associated memory 804. The processor includes various modules. The first module is a user interface module 803A that operates to receive signals from the user input device. The user can input a request to perform image stabilization on a selected video image sequence. The user can view the first frame of the video sequence and select a pixel within the sequence wherein the user interface module 803A receive this information and sends the information to a location module 803B that identifies the color of the selected pixel and accesses a second frame of the video data. The location module 803B searches the data values of the second frame in order to identify the pixel that is the closest color match to the pixel selected in the first frame. If no pixel is found that is within the color range, then the location module 803B defaults to a predetermined formula such as that which was described above. When a pixel has been identified, the location of the pixel is presented to a repositioning module 803C that re-addresses all of the pixels within the second frame such that the located pixel in the second frame has a new address that is the same display address as the pixel selected in the first frame. The address information along with the corresponding pixel color values are stored to memory by a storage module 803D.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

We claim:

1. A method for image stabilization of a first digital image having a plurality of pixels and at least a second image having a plurality of pixels wherein each pixel has an associated address for display and is representative of a color, the method comprising:

providing a color match range;

selecting a pixel within the first digital image;

identifying the color associated with the selected pixel in the first digital image;

locating a pixel in the second image that is within the color match range of the color associated with the pixel from the first digital image;

repositioning the second image, so that the address of the pixel in the second digital image is positioned at the address of the selected pixel in the first digital image; and storing the repositioned second digital image to memory.

2. The method according to claim 1 further comprising: selecting an image area to be used for locating a pixel in the second image.

3. The method according to claim 1, further comprising: providing an alignment point for aligning the first digital image and the repositioned second digital image such that the pixel of the first frame is aligned with the alignment point and the pixel in the second digital image is aligned with the alignment point when displayed on a display device.

4. The method according to claim 1, further comprising displaying the first and the repositioned second digital image sequentially on a display device.

5. The method according to claim 1, wherein the color match range requires an identical color match.

6. The method according to claim 1 wherein a color space having millions of colors is used to represent the pixel colors.

7. The method according to claim 1, wherein if a pixel is not located within the color match range, applying a predetermined formula for repositioning the pixels of the second frame.

8. The method according to claim 1, further comprising: receiving a signal containing information representative of a color match range.

9. A method for image stabilization of a digital sequence of images, wherein each image has a plurality of pixels and wherein each pixel has an associated address for display and is representative of a color, the method comprising:

selecting a beginning digital image and an ending digital image from the sequence creating a subset sequence;

selecting a pixel in the beginning digital image and a pixel in the ending digital image;

linearly interpolating between the color of the pixel in the beginning digital image and the color of the pixel in the ending digital image such that an interpolated color is determined for each image between the beginning digital image and the ending digital image;

for each interpolated color associated with an image, searching, within that image, for a pixel having the interpolated color within a predetermined range of colors;

repositioning each image between the beginning digital image and the ending digital image, so that the address of the pixel having the interpolated color within an image is positioned to the address of the pixel selected in the beginning image.

10. The method according to claim 9 further comprising displaying at least the subset sequence on a display.

11. The method according to claim 9 further comprising: selecting an image area to be used for locating a pixel in the second image.

12. The method according to claim 9, further comprising: providing an alignment point for aligning the first digital image and the repositioned second digital image such that the pixel of the first frame is aligned with the alignment point and the pixel in the second digital image is aligned with the alignment point when displayed on a display device.

13. The method according to claim 9, wherein the subset sequence includes all of the images within the sequence.

14. The method according to claim 9, wherein the predetermined range requires an identical color match.

15. The method according to claim 9 wherein the pixel colors are represented in a color space having millions of colors.

16. The method according to claim 9, wherein if a pixel is not located within the color match range, applying a predetermined formula for repositioning the pixels of the second frame.

17. The method according to claim 9, further comprising: receiving a signal containing information representative of a color match range.

18. A method for image stabilization of a sequence of temporally displayed digital video images, wherein each image contains a number of pixels and each pixel has an associated display position, the method comprising:

receiving a signal containing information representative of a color associated with a pixel contained within a first image of the sequence of digital video images;

identifying a pixel within a second image having a color value within a threshold range from the color contained within the first image, wherein the threshold may be any value including zero; and repositioning the second image such that the pixel within the second image having a color value within the threshold range resides at the same position as the pixel from the first image when temporally displayed.

19. The method according to claim 18, further comprising:

receiving a signal containing information representative of a color match range.

20. A method for image stabilization of a sequence of temporally displayed digital video images, wherein each image contains a number of pixels and each pixel has an associated display position, the method comprising:

receiving a signal containing information representative of a color associated with a pixel contained within a first image of the sequence of digital video images;

receiving a signal representative of a color contained in a third digital image;

interpolating between the color in the first digital video image and the color in the third digital video image to determine a searchable color in a second digital video image;

identifying a pixel within the second digital video image having a color distance within a threshold range from the searchable color, wherein the threshold may be any value including zero; and repositioning the second image such that the pixel within the second image having a color distance within the threshold range resides at the same position as the pixel from the first image when displayed on a display device.

21. A system for image stabilization of a video sequence having a plurality of video frames, the system comprising:

a user interface; and a processor;

wherein the processor includes a user interface module for receiving signals from the user interface;

wherein the signals include a signal representative of a pixel selection in a first video frame;

the processor also includes a location module for locating a pixel within a second frame having an associated color that is within a color range of a color associated with the pixel selection from the first video frame;

a repositioning module for readdressing the second video frame so that the located pixel of the second frame has an address that is the same address as the pixel selection form the first video frame; and a storage module for storing the readdressed second video frame.

22. The system according to claim 21, further comprising: memory.

23. A computer program product having a computer program thereon containing computer code for image stabilization of a first digital image having a plurality of pixels and at least a second image having a plurality of pixels wherein each pixel has an associated address for display and is representative of a color, the computer code comprising:

computer code for providing a color match range;

computer code for selecting a pixel within the first digital image;

computer code for identifying the color associated with the selected pixel in the first digital image;

computer code for locating a pixel in the second image that is within the color match range of the color associated with the pixel from the first digital image;

computer code for repositioning the second image, so that the address of the pixel in the second digital image is positioned at the address of the selected pixel in the first digital image; and computer code for storing the repositioned second digital image to memory.

24. The computer program product according to claim 23 further comprising:

computer code for allowing user selection of an image area to be used for locating a pixel in the second image.

25. The computer program product according to claim 23, further comprising:

computer code for allowing a user to provide an alignment point for aligning the first digital image and the repositioned second digital image such that the pixel of the first frame is aligned with the alignment point and the pixel in the second digital image is aligned with the alignment point when displayed on a display device.

26. The computer program product according to claim 23, further comprising: computer code for displaying the first and the repositioned second digital image sequentially on a display device.

27. The method according to claim 23, wherein the predetermined range requires an identical color match.

28. The computer program product according to claim 23 wherein the pixel colors are represented in a color space having millions of colors.

29. The computer program product according to claim 23, further comprising computer code for applying a predetermined formula for repositioning the pixels of the second frame if a pixel is not located within the color match range.

30. The computer program product according to claim 23, further comprising:

computer code for receiving a signal containing information representative of a color match range.

31. A computer program product for use with a computer having computer readable code thereon for image stabilization of a digital sequence of images, wherein each image has a plurality of pixels and wherein each pixel has an associated address for display and is representative of a color, the computer readable code comprising:

computer code for allowing user selection of a beginning digital image and an ending digital image from the sequence creating a subset sequence;

computer code for allowing user selection of a pixel in the beginning digital image and a pixel in the ending digital image;

computer code for interpolating between the color of the pixel in the beginning digital image and the color of the pixel in the ending digital image such that an interpolated color is determined for each image between the beginning digital image and the ending digital image;

computer code for searching, within that image, for a pixel having the interpolated color within a predetermined range of colors for each interpolated color associated with an image;

computer code for repositioning each image between the beginning digital image and the ending digital image, so that the address of the pixel having the interpolated color within an image is positioned to the address of the pixel selected in the beginning image.

32. The computer program product according to claim 31 further comprising: computer code for displaying at least the subset sequence on a display.

33. The computer program product according to claim 31 further comprising:

computer code for allowing a user to select an image area to be used for locating a pixel in the second image.

34. The computer program product according to claim 31, further comprising:

computer code for allowing user selection of an alignment point for aligning the first digital image and the repositioned second digital image such that the pixel of the first frame is aligned with the alignment point and the pixel in the second digital image is aligned with the alignment point when displayed on a display device.

35. The computer program product according to claim 31, wherein the subset sequence includes all of the images within the sequence.

36. The computer program product according to claim 31, wherein the color match range requires an identical color match.

37. The computer program product according to claim 31 wherein a color space having millions of colors is used to represent the pixel colors.

38. The computer program product according to claim 31, further comprising computer code for applying a predetermined formula for repositioning the pixels of the second frame if a pixel is not located within the color match range.

39. The computer program product according to claim 31, further comprising:

computer code for receiving a signal containing information representative of a color match range.

40. A computer program product for use with a computer wherein the computer program product has computer readable code thereon for image stabilization of a sequence of temporally displayed digital video images, wherein each image contains a number of pixels and each pixel has an associated display position, the computer code comprising:

computer code for receiving a signal containing information representative of a color associated with a pixel contained within a first image of the sequence of digital video images;

computer code for identifying a pixel within a second image having a color value within a threshold range from the color contained within the first image, wherein the threshold may be any value including zero; and computer code for repositioning the second image such that the pixel within the second image having a color value within the threshold range resides at the same position as the pixel from the first image.

41. The computer program product according to claim 40, further comprising:

computer code for receiving a signal containing information representative of a color match range.

42. A computer program product for use with a computer, the computer program product having computer readable code thereon for image stabilization of a sequence of temporally displayed digital video images, wherein each image contains a number of pixels and each pixel has an associated display position, the computer code comprising:

computer code for receiving a signal containing information representative of a color associated with a pixel contained within a first image of the sequence of digital video images;

computer code for receiving a signal representative of a color contained in a third digital image;

computer code for interpolating between the color in the first digital video image and the color in the third digital video image to determine a searchable color in a second digital video image;

computer code for identifying a pixel within the second digital video image having a color distance within a threshold range from the searchable color, wherein the threshold may be any value including zero; and computer code for repositioning the second image such that the pixel within the second image having a color value within the threshold range resides at the same position as the pixel from the first image when displayed on a display device.

\* \* \* \* \*